(12) United States Patent
Bonanno et al.

(10) Patent No.: US 9,235,419 B2
(45) Date of Patent: Jan. 12, 2016

(54) BRANCH TARGET BUFFER PRELOAD TABLE

(75) Inventors: James J. Bonanno, Wappingers Falls, NY (US); Ulrich Mayer, Weil im Schoenbuch (DE); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 13/492,997

(22) Filed: Jun. 11, 2012

(65) Prior Publication Data

US 2013/0332716 A1    Dec. 12, 2013

(51) Int. Cl.
*G06F 9/32* (2006.01)
*G06F 9/38* (2006.01)

(52) U.S. Cl.
CPC .................................... *G06F 9/3806* (2013.01)

(58) Field of Classification Search
CPC .................................................... G06F 9/3806
USPC ........................................................ 712/238
See application file for complete search history.

(56) References Cited

U.S. PATENT DOCUMENTS

| | | | | |
|---|---|---|---|---|
| 5,163,140 | A * | 11/1992 | Stiles et al. | 712/238 |
| 5,317,718 | A * | 5/1994 | Jouppi | 711/137 |
| 5,574,871 | A | 11/1996 | Hoyt et al. | |
| 6,178,498 | B1 * | 1/2001 | Sharangpani et al. | 712/238 |
| 6,427,192 | B1 | 7/2002 | Roberts | |
| 6,553,488 | B2 * | 4/2003 | Yeh et al. | 712/239 |
| 7,024,545 | B1 | 4/2006 | Zuraski, Jr. et al. | |
| 7,082,520 | B2 | 7/2006 | Bonanno et al. | |
| 7,107,437 | B1 * | 9/2006 | Padwekar | 712/238 |
| 7,165,168 | B2 * | 1/2007 | McDonald | 712/238 |
| 7,165,169 | B2 * | 1/2007 | Henry et al. | 712/240 |
| 7,343,481 | B2 * | 3/2008 | Williamson | 712/238 |
| 7,398,377 | B2 | 7/2008 | McDonald et al. | |
| 7,533,252 | B2 * | 5/2009 | Davis et al. | 712/239 |
| 7,552,254 | B1 | 6/2009 | George et al. | |
| 7,707,396 | B2 | 4/2010 | Bradford et al. | |
| 7,783,870 | B2 * | 8/2010 | Levitan et al. | 712/238 |
| 7,979,642 | B2 | 7/2011 | Bull et al. | |
| 2002/0046324 | A1 | 4/2002 | Barroso et al. | |

(Continued)

OTHER PUBLICATIONS

J. Lee, et al., Branch Prediction Strategies and Branch Target Buffer Design, Computer, Jan. 1984, 17 pages.
S. McFarling, Combining Branch Predictors, Technical Report TN-36m, Digital Western Research Laboratory, Jun. 1993, 29 pages.

(Continued)

*Primary Examiner* — Andrew Caldwell
*Assistant Examiner* — Yuqing Xiao
(74) *Attorney, Agent, or Firm* — Cantor Colburn LLP; Margaret McNamara

(57) ABSTRACT

Embodiments relate to using a branch target buffer preload table. An aspect includes receiving a search request to locate branch prediction information associated with a branch instruction. Searching is performed for an entry corresponding to the search request in a branch target buffer and a branch target buffer preload table in parallel. Based on locating a matching entry in the branch target buffer preload table corresponding to the search request and failing to locate the matching entry in the branch target buffer, a victim entry is selected to overwrite in the branch target buffer. Branch prediction information of the matching entry is received from the branch target buffer preload table at the branch target buffer. The victim entry in the branch target buffer is overwritten with the branch prediction information of the matching entry.

6 Claims, 6 Drawing Sheets

(56) References Cited

U.S. PATENT DOCUMENTS

| | | | |
|---|---|---|---|
| 2004/0015683 A1* | 1/2004 | Emma et al. | 712/240 |
| 2005/0204120 A1* | 9/2005 | Prasky et al. | 712/238 |
| 2007/0239974 A1* | 10/2007 | Park et al. | 712/238 |
| 2009/0210730 A1* | 8/2009 | Bonanno et al. | 713/320 |
| 2010/0064123 A1* | 3/2010 | Zuraski et al. | 712/239 |
| 2010/0228957 A1* | 9/2010 | Rabinovitch et al. | 712/238 |
| 2011/0107071 A1 | 5/2011 | Jacob | |
| 2011/0238966 A1 | 9/2011 | Takebe | |
| 2011/0296096 A1 | 12/2011 | Zou et al. | |

OTHER PUBLICATIONS

D. Jimenez, Delay-Sensitive Branch Predictors for Future Technologies, PhD Thesis, University of Texas at Austin, Jan. 2002, 165 pages.

N. Jouppi, Improving Direct-Mapped Cache Performance by the Addition of a Small Fully-Associative Cache and Prefetch Buffers, Proceedings of the 17th International Symposiumon Computer Architecture, IEEE, 1990, 10 pages.

Chi, et al., Load-Balancing Branch Target Cache and Prefetch Buffer, International Conference on Computer Design, 1999, 6 pages.

H. Ghasemzadeh, Modified Pseudo LRU Replacement Algorithm, ECBS '06 Proceedings of the 13th Annual IEEE International Symposium and Workshop on Engineering of Computer Based Systems, 2006, 6 pages.

* cited by examiner

BRANCH TARGET BUFFER PRELOAD TABLE

BACKGROUND

The present invention relates generally to computer processing systems, and more specifically, to using a branch target buffer preload table.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a system for using a branch target buffer preload table. The system includes a branch target buffer, a branch target buffer preload table, and a processing circuit configured to perform a method. The method includes receiving a search request to locate branch prediction information associated with a branch instruction. The method further includes searching for an entry corresponding to the search request in a branch target buffer and a branch target buffer preload table in parallel. Based on locating a matching entry in the branch target buffer preload table corresponding to the search request and failing to locate the matching entry in the branch target buffer, a victim entry is selected to overwrite in the branch target buffer. Branch prediction information of the matching entry is received from the branch target buffer preload table at the branch target buffer. The victim entry in the branch target buffer is overwritten with the branch prediction information of the matching entry.

Further exemplary embodiments include a computer-implemented method for using a branch target buffer preload table. The method includes receiving a search request to locate branch prediction information associated with a branch instruction. The method also includes searching, by a computer, for an entry corresponding to the search request in a branch target buffer and a branch target buffer preload table in parallel. Based on locating a matching entry in the branch target buffer preload table corresponding to the search request and failing to locate the matching entry in the branch target buffer, the computer selects a victim entry to overwrite in the branch target buffer. Branch prediction information of the matching entry is received from the branch target buffer preload table at the branch target buffer. The victim entry in the branch target buffer is overwritten with the branch prediction information of the matching entry.

Additional exemplary embodiments include a computer program product for using a branch target buffer preload table. The computer program product includes a tangible storage medium readable by a processing circuit and storing instructions for execution by the processing circuit for performing a method. The method includes receiving a search request to locate branch prediction information associated with a branch instruction. The method further includes searching, by the processing circuit, for an entry corresponding to the search request in a branch target buffer and a branch target buffer preload table in parallel. Based on locating a matching entry in the branch target buffer preload table corresponding to the search request and failing to locate the matching entry in the branch target buffer, the processing circuit selects a victim entry to overwrite in the branch target buffer. Branch prediction information of the matching entry is received from the branch target buffer preload table at the branch target buffer. The victim entry in the branch target buffer is overwritten with the branch prediction information of the matching entry.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
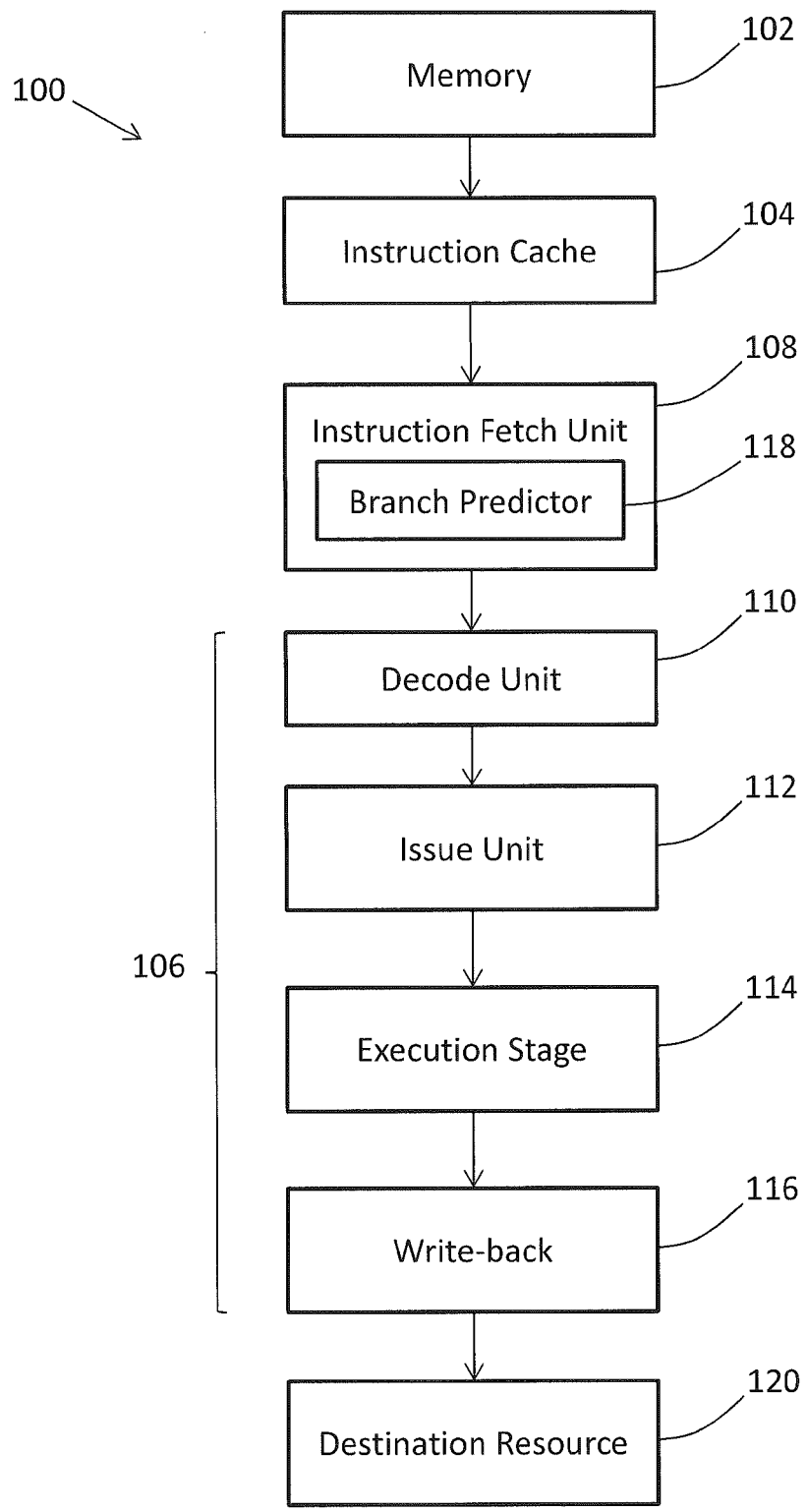
FIG. 1 depicts a processing system according to an embodiment.

Exemplary embodiments provide use of a branch target buffer preload table. A branch predictor can include a branch target buffer (BTB) and a number of structures and buffers to support branch prediction and branch target prediction. The BTB can be searched in parallel to and independently from instruction fetching to find upcoming branches, in which case it is called lookahead branch prediction. Alternatively, it can be accessed simultaneously with or after fetching instructions and determining instruction boundaries in order to provide a prediction for each encountered branch instruction, in which case it is called synchronous branch prediction. In either case performance benefits of the BTB are a function of the accuracy of the prediction provided from the BTB and the latency required to access the BTB.

A larger BTB typically provides better prediction accuracy than a smaller BTB because it can store information about more branch instructions; however, a larger BTB typically has a longer latency than a smaller BTB. A large BTB may be implemented with one or more large static random access memory (SRAM) arrays. Such large SRAM arrays often have a limited number of read and write ports (e.g., only 1 or 2) and have restrictions such that it may not be possible to both read and write to the same bank of the SRAM array in the same cycle. A small BTB can be implemented with one or more small SRAM register files. SRAM register files are often much more flexible in providing multiple read and write ports. However, multi-ported register files are often less dense than SRAM arrays, making multi-ported register files infeasible to implement a sufficiently large BTB to provide adequate performance, especially in commercial workloads with large instruction (and therefore branch) footprints.

In exemplary embodiments, BTB filtering is provided using a branch target buffer preload table (BTBP). The BTBP is a small BTB that is searched in parallel with a larger main BTB (BTB1) to predict branch instructions' targets, and optionally direction. Because the BTB1 is large, it can be implemented with large SRAM arrays which have a limited number of read and write ports (usually 1 or 2 reads and a single write port with the restriction that it is not possible to read and write to the same bank in the same cycle). However, since the BTBP is much smaller than the BTB1, it can be implemented with SRAM register files. The BTBP may have many read and write ports that can be used simultaneously. Therefore, multiple sources of branch prediction information can take advantage of the BTBP write bandwidth by being written to the BTBP first. The BTBP may be constructed to act as a filter for the BTB 1, where the BTB 1 receives branch prediction information from the BTBP. In exemplary embodiments, the BTBP only promotes branches that are considered the most useful (e.g., at least one search hit) from the BTBP into the BTB1. The BTBP can also serve as a set associative victim BTB cache by storing branch prediction information recently evicted from the BTB 1.

FIG. 1 depicts a block diagram a processing system 100 according to an embodiment. The processing system 100 includes a memory 102, an instruction cache 104, an instruction fetch unit 108, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art.

While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes a branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement branch target buffer filtering using a branch target buffer preload table.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
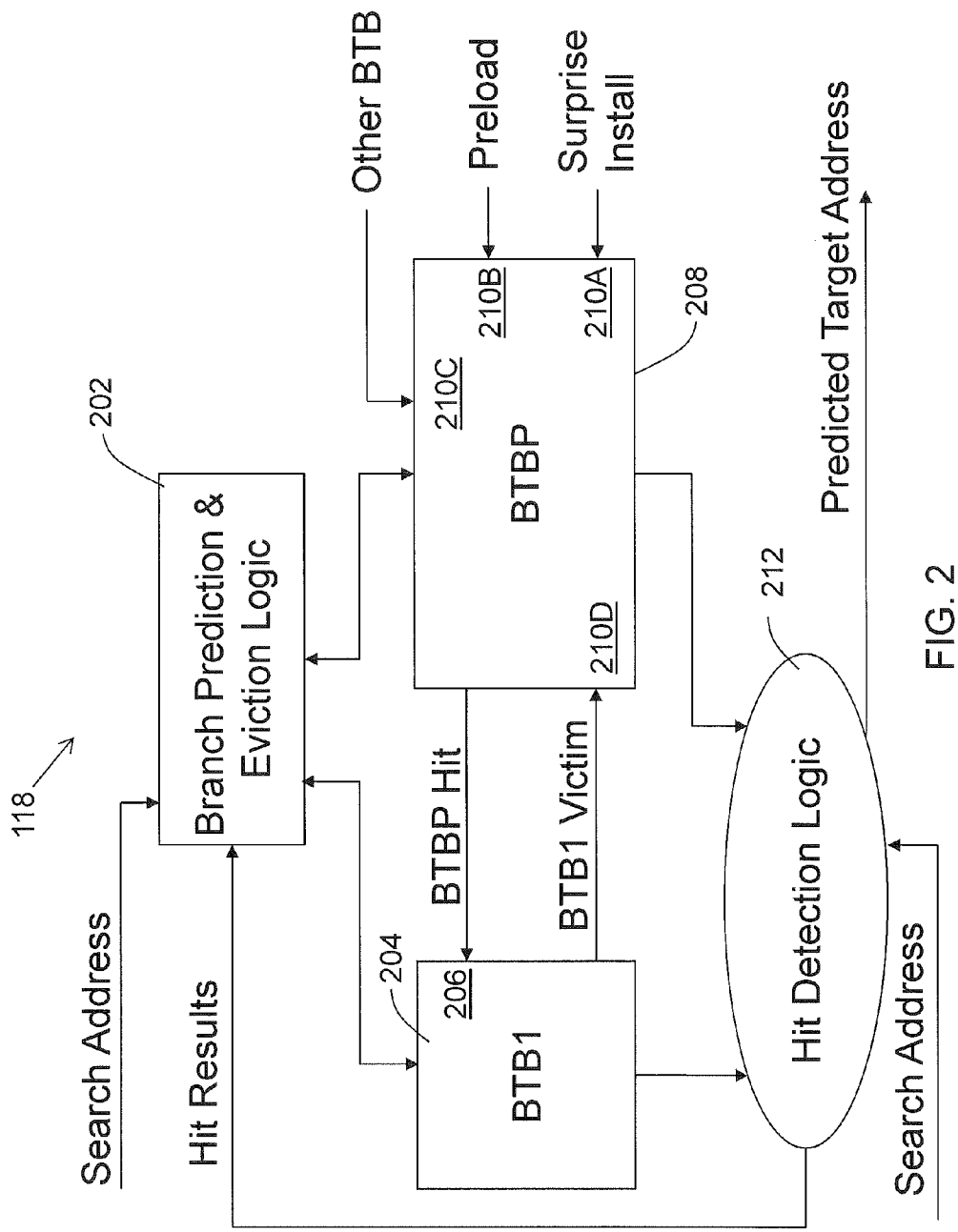
FIG. 2 depicts a branch predictor according to an embodiment.

FIG. 2 depicts an example of the branch predictor 118 of FIG. 1 in greater detail. The example branch predictor 118 of FIG. 2 includes branch prediction and eviction logic 202, BTB1 204 with write port 206, BTBP 208 with multiple write ports 210A-D, and hit detection logic 212. The branch prediction and eviction logic 202 can control access and updates of BTB entries in the BTB1 204 and BTBP 208, as well as movement of BTB entries between the BTB1 204 and BTBP 208. In an exemplary embodiment, BTB1 204 is a primary BTB and the BTBP 208 is configured as a filter for BTB entries installed in the BTB1 204. BTB installs are performed primarily through the BTBP 208, with BTB entries moving from the BTBP 208 to the BTB1 204 when hit detection logic 212 detects a hit or match corresponding to a search request. While the branch prediction and eviction logic 202 and the hit detection logic 212 are depicted separately, it will be understood that they can be combined into a single logic block or further subdivided.

Figure 3:
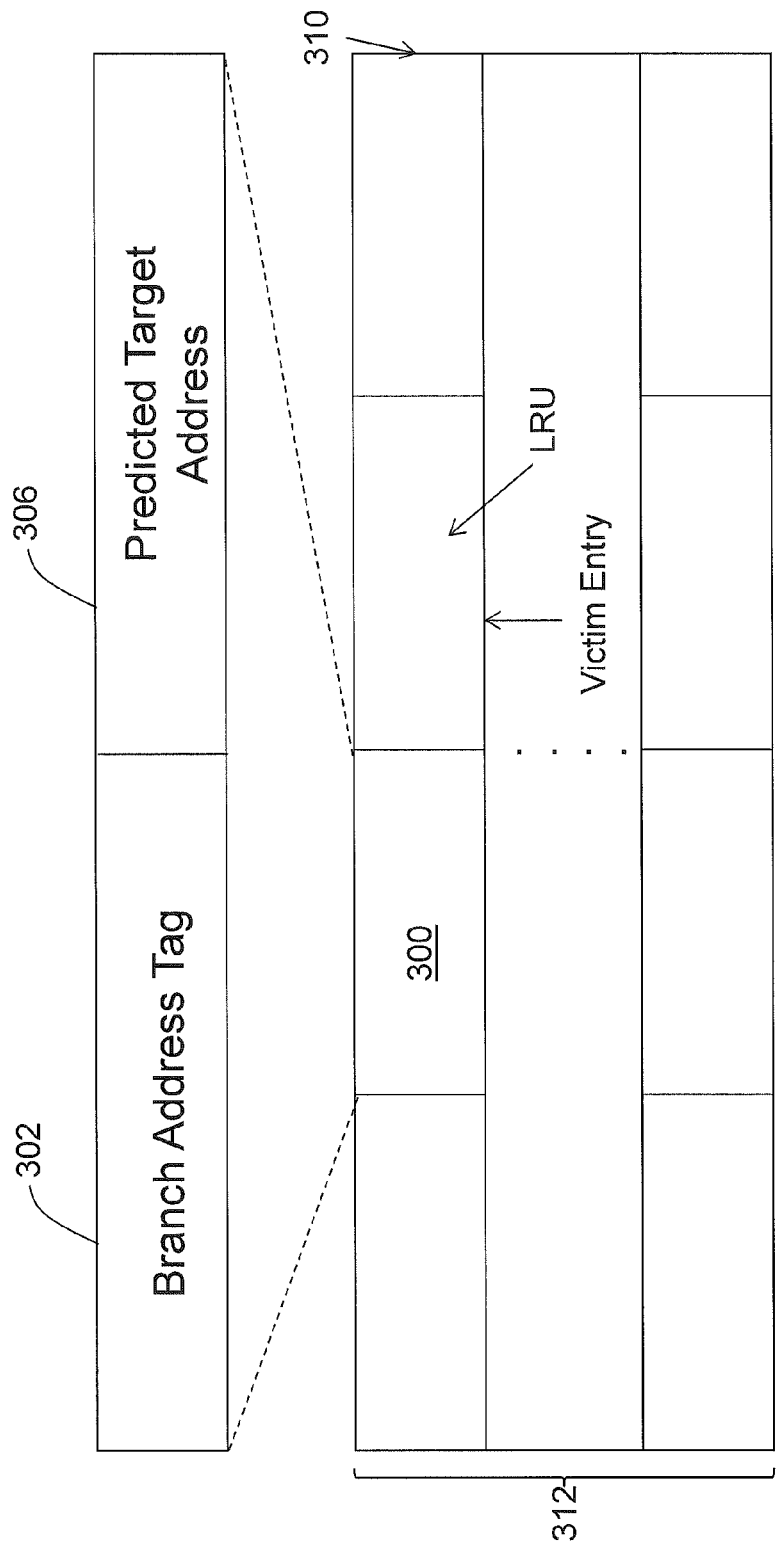
FIG. 3 depicts a branch target buffer entry according to an embodiment.

Each of the BTB1 204 and the BTBP 208 is set associative, including multiple sets of BTB entries. The BTBP 208 is a cache of branch prediction information similar to BTB1 204. A generic example of a BTB entry is depicted in FIG. 3 as BTB entry 300 (also referred to as entry 300), which includes a branch address tag 302 and a predicted target address 306. With continued reference to FIGS. 1-3, the branch address tag 302 is used to locate an entry within a BTB row 310, where each of the BTB1 204 and BTBP 208 of FIG. 2 can include multiple BTB rows 312 and multiple set associative BTB entries per BTB row 310. The BTB 1 204 and BTBP 208 can have different numbers of BTB rows 312 and columns relative to each other. A least recently used (LRU) identifier can also be tracked to assist in determining which BTB entry 300 was least recently used. Additional tracking information can include a victim entry identifier that identifies which BTB entry 300 to overwrite when a new BTB entry 300 is installed. The victim entry and LRU identifiers may be tracked separately depending on an entry install/replacement algorithm used to populate BTB entries 300. Each BTB entry 300 can include other branch prediction information (not depicted), such as a branch direction to indicate whether the associated branch was taken or not taken.

In an exemplary embodiment, an address of a branch instruction fetched by the instruction fetch unit 108 of FIG. 1 is used as a search address to access the branch predictor 118 and predict a branch target address. When looking for branch predictions, both the BTB1 204 and BTBP 208 are read. Either one can provide a branch prediction if it contains an entry with a branch address tag 302 matching the search address. The BTBP 208 and the BTB1 204 both provide input to hit detection logic 212 to determine whether a match or "hit" is located based on the search address. If a match is found, the hit detection logic 212 outputs a predicted target address. If the match was from the BTBP 208, a corresponding matching entry can be installed to the BTB1 204 as a BTBP hit to overwrite a victim entry in the BTB1 204, such that the most recent and relevant branch target predictions are maintained in the BTB 1 204.

The BTBP 208 supports multiple install sources and can use multiple ports 210A-D in parallel to support an increased install bandwidth. Examples of install sources include: a surprise install, a software preload install, a BTB install from another branch target buffer, and a victim install from the BTB 1 204. A surprise branch is a branch instruction that was not predicted by the hit detection logic 212 and detected as a branch only by the decode logic 110. Surprise branches that qualify for being included in the branch predictor 118 (for example, resolved taken branches), are installed (written) into the BTBP 208 through port 210A in the example of FIG. 2.

Another install source is a software preload install, which can be received from an architected preload instruction. In the example of FIG. 2, software preload installs are received at port 210B of the BTBP 208. Another install source can be from searching another level of a hierarchical BTB configuration, resulting in a BTB install from another branch target buffer. In the example of FIG. 2, BTB installs from another branch target buffer are received at port 210C of BTBP 208. As previously described, a further install source is a victim install from the BTB1 204. In the example of FIG. 2, victim installs from the BTB1 204 are received at port 210D of BTBP 208. Many different install sources may be implemented together to install branch prediction information into the BTBP 208. In any particular cycle multiple surprise branch installs and multiple preloads can be generated simultaneously. Since the BTBP 208 may be implemented as a small SRAM, the BTBP 208 can be sized to provide enough write ports to support a maximum rate of incoming write requests.

Figure 4:
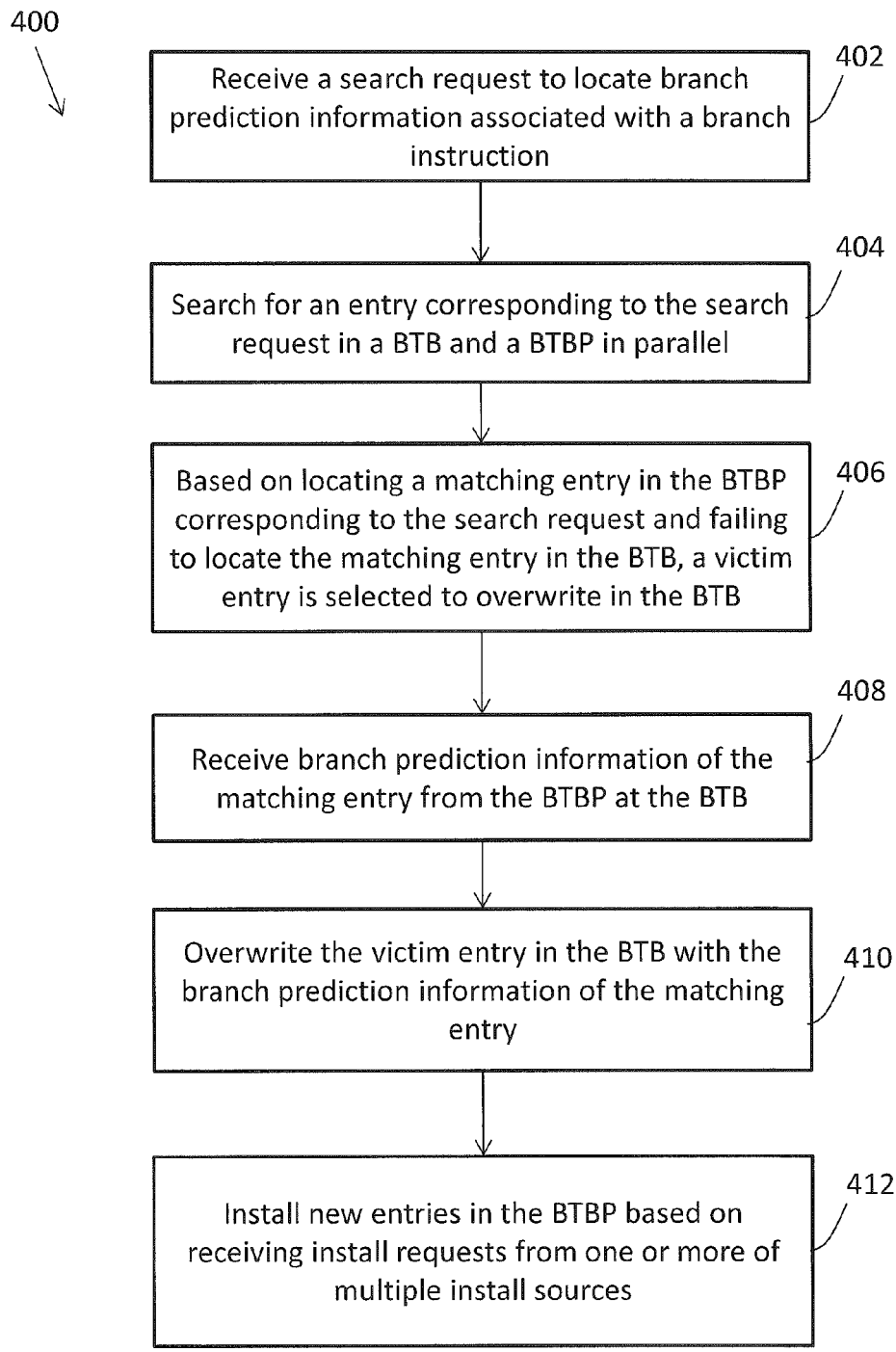
FIG. 4 is a flowchart illustrating a process of using a branch target buffer preload table according to an embodiment.

Turning now to FIG. 4, a process 400 using a branch target buffer preload table will now be described in an exemplary embodiment. The process 400 is described in reference to FIGS. 1-3 and can be implemented by the branch predictor 118 of FIGS. 1 and 2.

At block 402, the branch predictor 118 receives a search request to locate branch prediction information associated with a branch instruction. The search request can include a search address that is passed to the branch prediction and eviction logic 202 and used to index into the BTB1 204 and BTBP 208. At block 404, the branch prediction and eviction logic 202 searches for an entry corresponding to the search request in the BTB1 204 and BTBP 208 in parallel. The search may be performed by passing a BTB row 310 of the BTB1 204 and BTBP 208, as indexed by the search address, to the hit detection logic 212 to compare branch address tags 302 of BTB entries 300 relative to bits of the search address and identify a matching entry or a "hit". Alternatively, a pair of BTB entries 300 from the BTB1 204 and BTBP 208 can be passed to the hit detection logic 212 for comparison. Hit results of the hit detection logic 212 are returned to the branch prediction and eviction logic 202.

At block 406, based on locating a matching entry in the BTBP 208 corresponding to the search request and failing to locate the matching entry in the BTB1 204, the branch prediction and eviction logic 202 selects a victim entry to overwrite in the BTB 1 204. The victim entry, as depicted in FIG. 3, may correspond to an LRU BTB entry such that more recently used BTB entries are retained. Branch prediction information of the victim entry, which can include a complete victim entry or a subset of the victim entry, may be sent from the BTB1 204 to the BTBP 208. The BTB1 victim becomes an install source in the BTBP 208 such that a subsequent hit can result in moving the BTB1 victim back into the BTB1 204.

At block 408, the BTB 1 204 receives branch prediction information of the matching entry from the BTBP 208. The branch prediction information can include a complete BTB entry or a subset of a BTB entry from the BTBP 208. At block 410, the victim entry in the BTB1204 is overwritten with the branch prediction information of the matching entry. The branch prediction information of the victim entry can also be stored to the BTBP 208, where the BTBP 208 acts as a victim buffer for the BTB1 204. When updating the BTBP 208, the branch prediction information of the matching entry in the BTBP 208 can be overwritten with the branch prediction information of the victim entry from the BTB1 204. Alternatively, the victim entry from the BTB1 204 can be installed in a different location in the BTBP 208 other than the location of the matching entry. If the line sizes differ between the BTB1 204 and the BTBP 208, then if the BTB1 victim belongs in a different BTBP row than the matching entry, the matching entry of the BTBP 208 could be either invalidated and/or made LRU. An LRU or pseudo-LRU algorithm can be used to determine which BTBP entry 300 to pick to replace with the BTB1 victim.

Based on locating the matching entry in the BTBP 208 corresponding to the search request and failing to locate the matching entry in the BTB1 204, the hit detection logic 212 outputs a predicted target address from the BTBP 208 (e.g., predicted target address 306) as the branch prediction information associated with the branch instruction. Based on locating the matching entry in the BTB1 204 corresponding to the search request, a predicted target address from the BTB1 204 can be output as the branch prediction information associated with the branch instruction. If the matching entry is found in both the BTB1 204 and the BTBP 208, a predicted target address is selected from one of the BTB1 204 and the BTBP 208. Arbitration between the BTB1 204 and the BTBP 208 may select the predicted target address from the BTB1 204.

At block 412, new entries are installed in the BTBP 208 based on receiving install requests from one of multiple install sources. Installing a new entry in the BTBP 208 may be based on receiving one or more of: a surprise install, a software preload install, a BTB install from another branch target buffer, and a victim install from the BTB1 204. Each install source can be associated with a different port 210 of the BTBP 208. For example, the surprise install can be received at a first port 210A of the BTBP 208. The software preload install can be received at a second port 210B of the BTBP 208. The BTB install from another BTB can be received at a third port 210C of the BTBP 208. The victim install from the BTB1 204 can be received at a fourth port 210D of the BTBP 208.

Parallel writes can be supported through the ports 210A-D and additional read/write ports can also be supported depending on the microarchitecture of the processing system 100 of FIG. 1.

Figure 5:
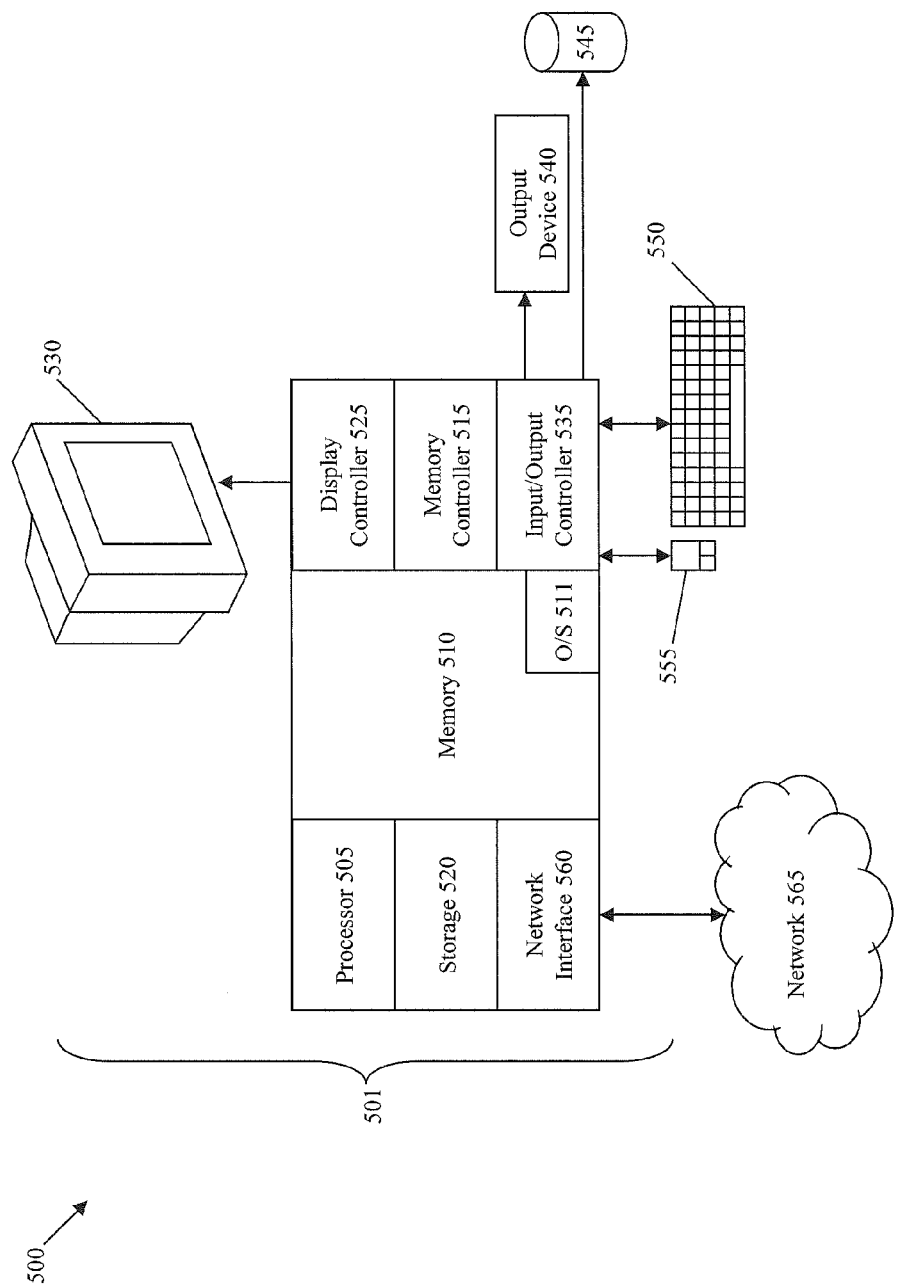
FIG. 5 depicts a computing system according to an embodiment.

FIG. 5 depicts a block diagram of a system 500 for using a branch target buffer preload table in a processor 505. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore includes general-purpose computer 501 as illustrated in FIG. 5.

In an exemplary embodiment, in terms of hardware architecture, as shown in FIG. 5, the computer 501 includes a processor 505 which is a processing circuit that includes the processing pipeline 106 of FIG. 1 and a branch predictor 118. The computer 501 further includes memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 610 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to fetch and execute instructions stored within the memory 510, to communicate data to and from the memory 510, and to generally control operations of the computer 501 pursuant to the instructions.

In an exemplary embodiment, where the branch predictor 118 of FIG. 2 is implemented in hardware, the methods described herein, such as process 400 of FIG. 4, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
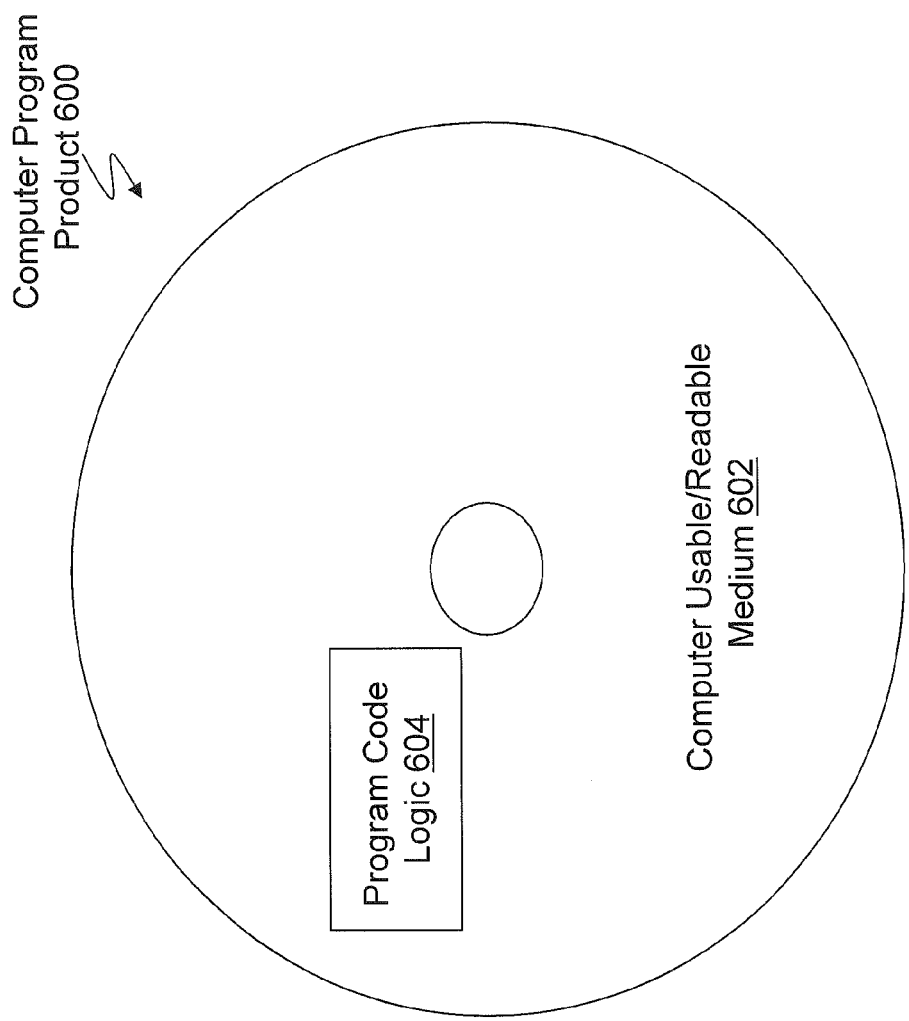
FIG. 6 depicts a computer-readable medium according to an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include using a branch target buffer preload table to increase bandwidth to and from a branch predictor and act as a filter to a BTB. The BTBP can receive branch prediction information from multiple install sources and support simultaneous access through multiple ports. The BTBP may act as a victim buffer for recently evicted predictions from the BTB. By storing and confirming branch predictions in the BTBP before populating the BTB, the BTB can retain a higher percentage of accurate predictions.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for using a branch target buffer preload table, the system comprising:
    a branch target buffer;
    a branch target buffer preload table, wherein a capacity of the branch target buffer preload table to store entries is less than a capacity of the branch target buffer to store entries thereby enabling the branch target buffer preload table to have higher read and write bandwidth in comparison to the branch target buffer, and the branch target buffer preload table comprises multiple ports to support installing new entries in parallel from multiple install sources, wherein the multiple install sources comprise a surprise install, a software preload install, a branch target buffer install from an other branch target buffer, and a victim install from the branch target buffer; and
    a processing circuit configured to perform a method comprising:
    receiving a search request to locate branch prediction information associated with a branch instruction;
    searching for an entry corresponding to the search request in the branch target buffer and the branch target buffer preload table in parallel;
    based on locating a matching entry in the branch target buffer preload table corresponding to the search request and failing to locate the matching entry in the branch target buffer, selecting a victim entry to overwrite in the branch target buffer;
    receiving branch prediction information of the matching entry from the branch target buffer preload table at the branch target buffer;
    overwriting the victim entry in the branch target buffer with the branch prediction information of the matching entry;
    receiving the surprise install at a first port of the branch target buffer preload table, the surprise install based on a branch instruction that was not predicted and was taken;
    receiving the software preload install at a second port of the branch target buffer preload table; and
    installing new entries in the branch target buffer preload table based on receiving install requests as one or more of: the surprise install, the software preload install, the branch target buffer install from the other branch target buffer, and the victim install from the branch target buffer.

2. The system of claim 1, wherein the processing circuit is further configured to perform:
    sending branch prediction information of the victim entry to the branch target buffer preload table; and
    storing the branch prediction information of the victim entry to the branch target buffer preload table.

3. The system of claim 2, wherein storing the branch prediction information of the victim entry to the branch target buffer preload table further comprises overwriting the branch prediction information of the matching entry in the branch target buffer preload table with the branch prediction information of the victim entry.

4. The system of claim 1, wherein the processing circuit is further configured to perform:
    based on locating the matching entry in the branch target buffer preload table corresponding to the search request and failing to locate the matching entry in the branch target buffer, outputting a predicted target address from the branch target buffer preload table as the branch prediction information associated with the branch instruction; and
    based on locating the matching entry in the branch target buffer corresponding to the search request, outputting a predicted target address from the branch target buffer as the branch prediction information associated with the branch instruction.

5. The system of claim 1, wherein the branch target buffer preload table has a greater number of ports than the branch target buffer, and the branch target buffer preload table is implemented in a multi-ported register file.

6. The system of claim 1, wherein the processing circuit is further configured to perform:
    receiving the branch target buffer install from the other branch target buffer at a third port of the branch target buffer preload table; and
    receiving the victim install from the branch target buffer at a fourth port of the branch target buffer preload table.

* * * * *